Jan. 26, 1971 T. F. LABAN ETAL 3,558,755
MANUFACTURE OF LAYERED SYNTHETIC PRODUCTS
Filed March 10, 1969 2 Sheets-Sheet 1

INVENTORS
BERTUS H. ZANDSTRA &
THEODORUS F. LABAN

BY *Francis W. Young*
ATTORNEY

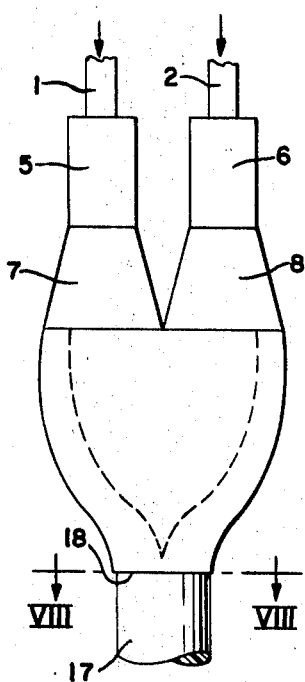
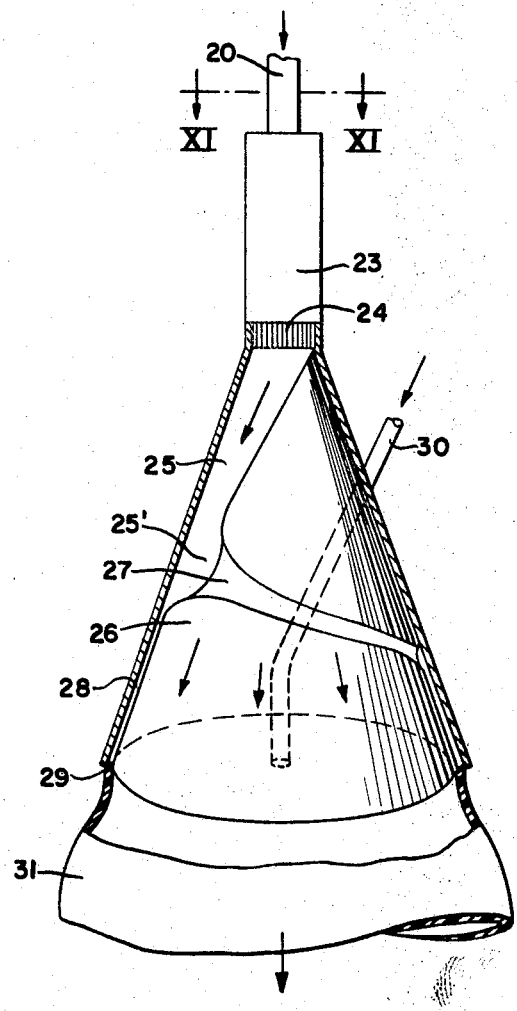
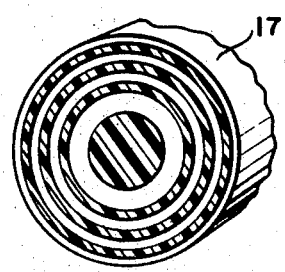
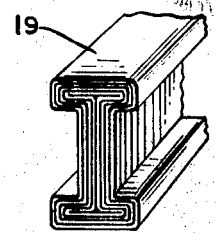
INVENTORS
BERTUS H. ZANDSTRA &
THEODORUS F. LABAN 3,558,755
MANUFACTURE OF LAYERED SYNTHETIC
PRODUCTS
Theodorus F. Laban, Rheden, and Bertus H. Zandstra,
Arnhem, Netherlands, assignors to American Enka
Corporation, Enka, N.C., a corporation of Delaware
Filed Mar. 10, 1969, Ser. No. 805,586
Claims priority, application Netherlands, Mar. 15, 1968,
6803692
Int. Cl. B29f 3/12
U.S. Cl. 264—95     8 Claims

ABSTRACT OF THE DISCLOSURE

A process for producing a synthetic polymeric product made up of a plurality of layers of alternately different component polymers which comprises forming at least one multi-layer stream of parallel flat polymeric layers, passing a stream of the parallel flat layers into either half of an annular space to form two sub-streams, causing the sub-streams to coalesce to form a main annular stream of uninterrupted annular polymeric layers, and thereafter extruding the main stream through an extrusion opening, and cooling the extruded stream. The thinnest layer of the multi-layer stream has a thickness not less than about one millimeter.

---

This invention relates to the manufacture of a synthetic product consisting of at least two different component polymers and having a wall structure of a number of layers of alternately different component polymers. More particularly this invention relates to a process for producing layered polymeric products in which at least one stream consisting of at least two adjacent polymer streams or layers is formed into at least one multi-layer stream of parallel flat polymeric layers, a multi-layer stream is then formed into an annular stream having uninterrupted annular layers and the annular stream is extruded and cooled down.

A process for manufacturing films which is similar to that of this invention is known and is described in Netherlands patent application 65–12918. In this process which is directed to the manufacture of a multi-layer flat film, a layered structure is obtained by repeatedly doubling the number of layers in a polymeric stream and by flattening the layers with the aid of an apparatus which is known and described in Netherlands patent specification 103,356 and also in U.S. Patent 3,051,453.

In accordance with this invention, it has now surprisingly been found that by using certain additional process steps, with the known process a novel process is provided for manufacturing synthetic polymeric products such as tubular synthetic films, tubes, bars or the like.

Thus this invention contemplates a process for the manufacture of synthetic polymeric products comprising at least two different polymeric components and having a number of layers of alternately different component polymers which comprises forming at least one multi-layer stream of parallel flat layers, the thinnest layer having a thickness of not less than about one millimeter, passing a stream of the parallel flat layers into either half of an annular space to form two sub-streams which fill the annular space, causing the sub-streams to coalesce to form a main annular stream of uninterrupted annular layers, extruding the main stream through an extrusion opening, and cooling the extruded stream. Contrary to what might be expected it has been advantageously found that upon coalescence of the two sub-streams the planes of separation of the different layers in the sub-streams accurately adjoin and form a plurality of continuous uninterrupted layers.

More particularly, this invention is directed to a process for producing products having at least four layers of alternately different component polymers in which at least one stream containing at least two adjacent polymeric streams is treated so that the number of layers is increased, and the layers are flattened and reduced in thickness to form at least one multi-layer stream of parallel flat layers, the thinnest separate layer having a thickness not less than about one millimeter, a stream consisting of at least four of the flat layers is passed into either half of an annular space and is distributed therein to form two sub-streams, and the sub-streams are caused to coalesce in such manner that the component polymers form uninterrupted annular layers.

Tubular films and relatively thicked-walled tubular products according to the invention may be manufactured in a relatively simple manner when the layered annular stream formed of the two sub-streams is extruded through an annular slit. Tubular films may be advantageously obtained if after extrusion through an annular slit the layered annular stream is blown up, by using a compressed gaseous medium, to a tubular film of which the diameter is larger than that of the extrusion slit.

For the purpose of obtaining films of the usual desired thickness the process of the invention is further characterized in that the total thickness of the layered annular main stream formed after coalescence of the sub-streams is reduced to, for instance, 1 millimeter, before the main stream leaves the annular extrusion slit.

According to the invention the number of layers is with advantage increased by repeatedly doubling them.

One embodiment of the process of the invention is characterized in that the sub-streams, after they have been formed, are fed in opposite directions into a gradually narrowing circumferential channel which opens on one side into an annular slit, and (while in the form of a thin annular stream) each of the streams leaves the circumferential channel in a direction toward an annular extrusion slit.

Another embodiment of the process according to the invention makes it possible in a simple manner to obtain rod-shaped products. In this embodiment the process is characterized in that the layered annular stream is transformed into a stream of circular cross-section which is extruded through a circular slit. The process according to the invention also makes it possible to manufacture bars of non-round, for instance I- or T-shaped cross-section, when the annular stream is suitably transformed and forced through an extrusion opening of non-round or of I- or T-shaped cross-section.

The invention will be further described with reference to the accompanying schematic drawings; in which:

FIG. 7 shows an apparatus for the manufacture of another embodiment of the polymeric products of this invention;

FIG. 8 shows a cross-section of a multi-layer polymeric structure in the form of a rod;

FIG. 9 shows a multi-layer polymeric structure of I-shaped cross-section;

FIG. 10 shows another apparatus for the manufacture of tubular films in accordance with the process of this invention; and FIG. 11 is a cross-sectional view of the layered stream entering the apparatus shown in FIG. 10 taken along the line XI—XI.

Figure 1:
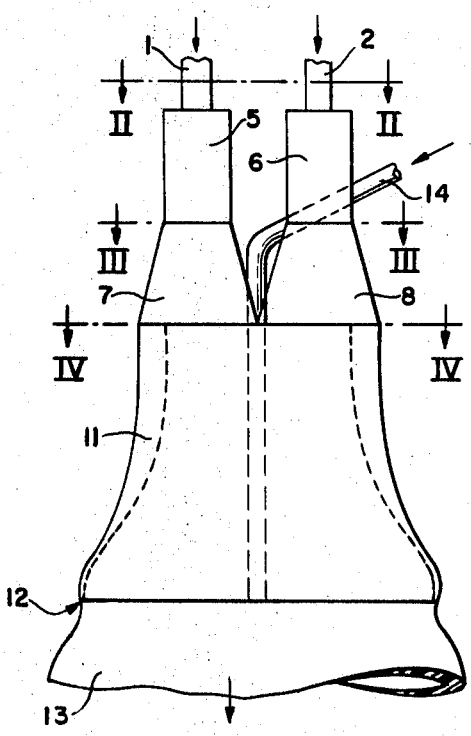
FIG. 1 shows an apparatus for the manufacture of the tubular films of this invention.
tubular films of this invention.
Figure 2:
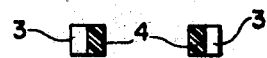
FIGS. 2, 3 and 4 are cross-sectional views of the layered structure and the shape of the polymeric stream taken along the lines II—II, III—III, and IV—IV in FIG. 1.

In the apparatus shown in FIG. 1 two substantially non-miscible component polymers 3 and 4, for instance molten polyamide and polyester, are supplied side by side in the directions indicated by the arrows through conduits 1 and 2 by pumps (not shown). The feed conduits 1 and 2 terminate in widened channels 5 and 6 respectively. In each of the channels there are provided two stationary guiding members in which the number of layers of the polymeric components in each of the channels 5 and 6 is increased from two to eight, i.e. by a factor $2^2=4$.

Figure 3:

FIG. 3 is a cross-sectional view taken along the line III—III of the layered streams at the ends of the channels 5 and 6. In the channels 5 and 6 the streams are repeatedly flattened and doubled. The guiding members (not shown) for doubling the number of layers are known and are of the type described in Netherlands patent specification 103,356, and also in U.S. Pat. 3,051,453. After leaving the channels 5 and 6, the layered streams flow into the tube pieces or tube-forming elements 7 and 8. In the direction of flow of the liquid (or molten) polymer, the square cross-sectional shape of the tube pieces shown in the plane III—III gradually changes to the semi-circular shape shown in the plane IV—IV, with the cross-sectional surface area remaining substantially unchanged.

Figure 4:
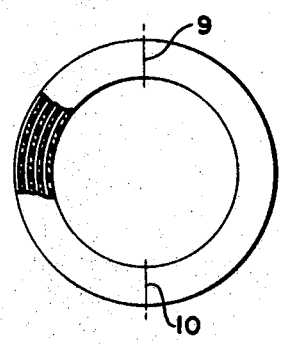

FIG. 4 shows that in the plane IV—IV each of the layered polymeric sub-streams leaving the tube pieces 7 and 8 fills one half of an annular space. Along lines 9 and 10 in the plane IV—IV the layered sub-streams leaving the tube pieces 7 and 8 are caused to coalesce in such a way that the different component polymers will form continuous uninterrupted layers. The resulting layered annular stream is then forced through an annular slit 11 of gradually increasing diameter and finally through a slit 12 to form a tubular thermoplastic synthetic film 13 having a wall structure consisting of eight polymeric layers. Compressed air may be supplied by way of a channel 14 for blowing up the freshly extruded film to a desired larger diameter.

Figure 5:
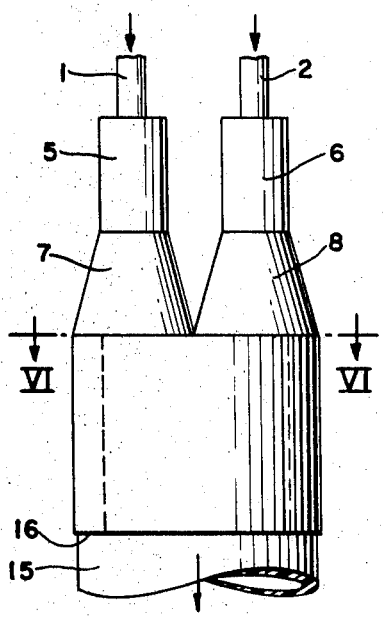
FIG. 5 shows an apparatus for the manufacture of multi-layer thick-walled polymeric tubular products of this invention.
Figure 6:
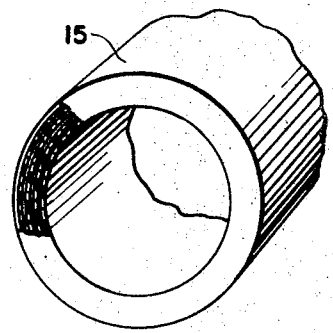
FIG. 6 shows one embodiment of a multi-layer thick-walled tubular product of this invention.

FIG. 5 shows another apparatus for the manufacture of a relatively thick-walled tubular product 15 by use of an annular extrusion slit 16. As is shown in FIG. 6, the wall of this tubular product consists of 8 alternating layers.

FIG. 7 shows an apparatus for the manufacture of a thermoplastic bar or rod in accordance with the process of this invention which uses a circular extrusion opening 18. The rod 17 as is shown in FIG. 8, consists of a polymeric core which is surrounded by 7 rings or layers of alternating component polymers.

FIG. 9 shown an I-section bar 19 having a layered cross-section which is manufactured by using an I-shaped extrusion slit in the place of the circular opening 18.

FIG. 10 represents another embodiment of the process for the manufacture of tubular synthetic film according to the invention. In this embodiment two different component polymers 21 and 22 flow side by side through supply channel 20 (see FIG. 11) under pressure in the direction indicated by the arrow. The channel 20 opens into a widened channel 23 in which there are positioned guiding members of the aforementioned type for increasing the number of layers. As a result, the schematically illustrated stream 24 issuing from the channel 23 is multilayered. The stream 24 flows via channel 25 downward some distance to the point or zone 25' where the channel 25 opens into a circumferential channel 27 which is formed in the circumferential surface of the approximately conically-shaped member 26. From either side of the zone 25' (where the channel 25 opens into channel 27) the channel (i.e. channel 27) gradually narrows in a circumferential direction until the cross-sectional surface area of the channel 27 opposite the aforementioned point 25' is substantially equal to zero. This causes the multi-layer stream 24 in the channel 27 to be divided (at zone 25') into two substreams which will again coalesce along the circumferential surface of the conical member 26 and simultaneously flow downwards through the narrow annular space 28. The total cross-sectional area of the space in which the polymer spreads around the conical member should preferably remain constant. The resistance to circumferential flow should be considerably smaller, for instance a factor of 0.01 to 0.001, than the resistance to annular flow through the space 28. In this manner, the layers of the sub-streams flowing from either side of the space will accurately adjoin each other. A layered annular stream is finally extruded through an annular slit 29. By way of channel 30 compressed air is supplied for blowing up the polymer stream to a tubular synthetic film 31, the diameter of which is larger than that of the extrusion slit.

It will be appreciated that instead of two component polymers use may be made of three or more polymeric components. Also use may be made of different types of component polymers such as polyamide, polyester, polyethylene, thermoplastic rubber, and the like. However, it is essential that the viscosities of each of the liquid polymeric streams should not vary too widely from the other. Also the polymers are substantially non-miscible.

What is claimed is:

1. A process for producing a synthetic polymeric product having a number of layers of alternately different component polymers which comprises forming at least one multilayer stream of parallel flat polymeric layers, the thinnest layer having a thickness not less than about 1 millimeter, passing a stream of the parallel flat layers into either half of an annnular space to form two sub-streams, causing the sub-streams to coalesce within the annular space to form a main annular stream of uninterrupted annular polymeric layers, extruding the main stream through an extrusion opening, and cooling the extruded stream.

2. The process of claim 1 in which the number of layers is increased by repeatedly doubling the layers.

3. The process of claim 1 in which said sub-streams are fed in opposite directions into a gradually narrowing circumferential channel which is open on one side and are directed in the form of thin annular streams from the circumferential channel in the direction of the extrusion slit.

4. The process of claim 1 in which the layered main annular stream is transformed into a stream of circular cross-section which is extruded through a circular slit.

5. The process of claim 1 in which the layered main annular stream is extruded through an annular slit.

6. The process of claim 5 in which the layered main annular stream extruded from said slit is blown up to a tubular film having a diameter larger than that of the extrusion slit by a compressed gaseous medium.

7. The process of claim 6 in which the total thickness of the layered main annular stream formed after coalescence of the sub-streams is reduced to 1 millimeter before said main stream is extruded from said annular extrusion slit.

8. A process for producing a synthetic polymeric product comprising at least two different component polymers and having a wall structure made up of at least four layers of alternately different component polymers which comprises treating at least one stream containing at least two adjacent polymeric streams to form a number of alternating polymeric layers, increasing the number of layers and flattening the layers to form at least one multi-layer stream of parallel flat layers, flattening of the layers being effected in such a manner that the thinnest layer has a thickness not less than approximately one millimeter, thereafter passing a stream consisting of at least four of the flat parallel layers into either half of an annular space and distributing the layers therein to form two substreams which fill the annular space, causing the streams to coalesce so that the different component polymer layers form a main annular stream of uninterrupted annular layers, extruding the main stream through an extrusion opening and cooling the resulting extruded stream.

References Cited

UNITED STATES PATENTS 3,051,453  8/1962  Sluijters _____ 259—4

FOREIGN PATENTS 1,116,739  6/1968  Great Britain _____ 156—244

ROBERT F. WHITE, Primary Examiner

T. J. CARVIS, Assistant Examiner

U.S. Cl. X.R.

18—13; 264—171, 173